United States Patent
Taylor

[15] 3,655,218
[45] Apr. 11, 1972

[54] APPARATUS FOR TRANSPORTING HEAVY OBJECTS

[72] Inventor: Louis Dale Taylor, 624 Park Avenue, Freehold, N.J. 07728

[22] Filed: May 19, 1970

[21] Appl. No.: 38,665

[52] U.S. Cl. ............................ 280/179, 298/18, 214/501
[51] Int. Cl. ........................................................ B60p 7/08
[58] Field of Search ..................... 296/3; 298/18; 214/501; 280/179

[56] References Cited

UNITED STATES PATENTS 2,903,274  9/1959  Leonard ............................... 280/179
3,236,562  2/1966  Maxon ................................. 298/18 X

*Primary Examiner*—Philip Goodman
*Attorney*—Bryan W. Sheffield

[57] ABSTRACT

An articulated flat bed trailer for transporting large, bulky objects such as ships propellers and the like. The flat bed of the trailer includes a hinged portion hydraulically rotatable from the horizontal position to an angle of approximately 55°-35° from the horizontal to minimize simultaneously horizontal and vertical overhang of the object. Means are provided to maintain the center of gravity of the rotated flat bed portion - object combination within safe limits.

5 Claims, 6 Drawing Figures

Patented April 11, 1972

INVENTOR
L. D. TAYLOR
BY B. W. Sheffield
ATTORNEY

Patented April 11, 1972

APPARATUS FOR TRANSPORTING HEAVY OBJECTS

BACKGROUND OF THE INVENTION

Broadly speaking, this invention relates to an apparatus for transporting heavy objects. More particularly, in a preferred embodiment, this invention relates to an apparatus for transporting heavy objects having one dimension thereof substantially smaller than the other dimensions thereof.

The transportation of large, bulky objects poses severe problems for the transportation industry. In particular, the transportation of large, bulky objects having one dimension thereof substantially smaller than the other dimensions thereof is particularly difficult and in many instances the problems are insurmountable. Examples of such objects are airplane wings, ships propellers, sections of pre-fabricated houses, containerized shipping cartons, etc.

The problem, basically, is that when objects of this weight and bulk are transported by road, the transportation vehicle is subject to various Federal and State regulations which limit the overall, effective width of the vehicle. Similarly, when such objects are shipped by rail, the clearance which must be maintained between adjacent parallel tracks of the railroad, also limits the overall, effective width of the vehicle. Similar considerations apply to the transportation of such objects by sea or canal barge.

Manifestly, these problems cannot be overcome simply by rotating the bulky object by 90°. This would certainly reduce the overall effective width of the vehicle, but only at the expense of the overall, effective height. Thus, the transportation vehicle would encounter severe difficulties in negotiating routes which had bridges, tunnels, overhead wires, etc. in its path.

As a solution to this problem, U.S. Pat. No. 2,903,274 which issued Sept. 8, 1959 in the name of T. A. Leonard, Jr. proposed a support mechanism which could be bolted to the bed of a conventional flat-bed articulated trailer to support the bulky object to be transported. The support could be pivoted between two fixed positions; one co-planar with the bed of the truck, the other at a 45° angle to the plane of the bed of the truck. The bulky object to be transported was lifted onto the support, and secured thereto, while the support was in the horizontal position. Then, the support was moved to its second position, so that the object to be transported made a 45° angle to the bed of the truck. The 45° angle was, of course, chosen to simultaneously minimize the effective, overall width and height of the truck—object combination. It will be evident that the apparatus disclosed in U.S. Pat. No. 2,903,274 was designed on the basis of two assumptions. These assumptions are:

1. The object to be transported is symmetrical and hence tilting to a 45° angle will simultaneously minimize both the effective overall height and width; and
2. When so tilted, the center of gravity of the truck—object combination falls between the wheels of the truck, on the center line, so that the combination is in a stable state of equilibrium.

These assumptions are, in general, not true for the majority of workpieces to be transported. Only occasionally is a perfectly symmetrical workpiece to be found. Thus, the apparatus show in U.S. Pat. No. 2,903,274 is of limited application in the industry.

Put another way, in general, tilting the object to be transported at a fixed angle of 45° to the bed of the truck will not simultaneously minimize both the effective width and height of the truck—object combination. Worse than that, however, is the fact that the center of gravity of the combination may lie dangerously close to one of the sets of wheels so that in any emergency situation, or on a sharp curve, there is a very real danger that the vehicle may overturn, with consequent loss of life and limb, not only to the driver, but to the public as well.

The object of this invention, then, is to find an apparatus for transporting large, bulk, heavy objects having one dimension substantially smaller than the other dimension thereof which will simultaneously minimize the overall, effective width and height of the truck - object combination but yet which will at all times be in a stable state of equilibrium.

The above problem has been solved by the instant invention which in one illustrative embodiment comprises an apparatus for transporting an object having one dimension substantially smaller than its other dimensions, which comprises a main body member adapted to receive at least one pair of rotatable transporting wheels; a secondary body member pivotally mounted to said main body member; means connected to said main body member, for rotating said secondary body member about an axis of said main body member between a position substantially co-planar with said main body member and a position substantially normal to the plane of said main body member; and means, connected to said secondary body member, for mounting said object to said secondary body member so that as said main body member is rotated by said rotating means, the horizontal and vertical overhang of said object is minimized simultaneously.

The invention and its mode of operation will be more fully understood from the following detailed description and drawings in which.

DETAILED DESCRIPTION OF THE INVENTION

Figure 1:
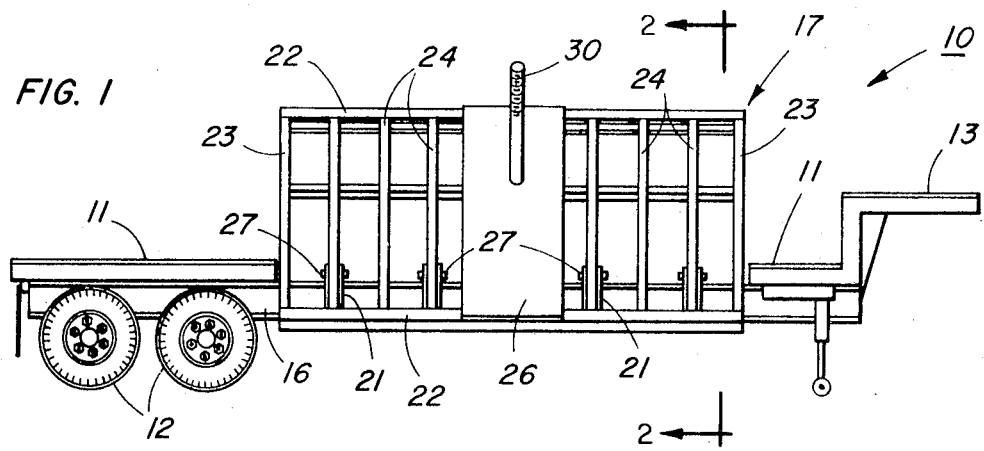
FIG. 1 is a side view of one illustrative embodiment of the invention.

The invention will now be described with reference to an illustrative embodiment, i.e., an articulated tractor-trailer truck. One skilled in the art, however, will appreciate that the invention is not so limited and may be used in the rail, ship and airplane transportation industries. Referring now to FIG. 1, articulated trailer 10 comprises a flat bed 11, having a plurality of pneumatic tires 12 rotatably mounted thereto by conventional axle means. The trailer 10 has a stepped portion 13 to receive the mating portion of a trailer truck, which truck supplies the necessary motive power for trailer 10.

A pair of I beams 16 extend along the length of flat bed 11, as far as stepped portion 13, to provide support for any load placed thereon. The I beams 16 are fastened to the lower surface of flat bed 11 and to the axle of tires 12. A load supporting member 17 is cut from the central portion of flat bed 11 and is pivotally mounted to one of the I beams 16 by means of hinge members 21 mounted thereto. Load supporting member 17 comprises a pair of outer beam supports 22, a pair of end beams 23 and a plurality of cross-beams 24 supporting a plate 26.

Load supporting member 17 is fastened to hinge members 21 by means of pins 27 passing through hinge members 21 and into cross beams 24.

A threaded, cylindrical workpiece retaining pin 30 is fastened at one end to plate 26.

Figure 2:
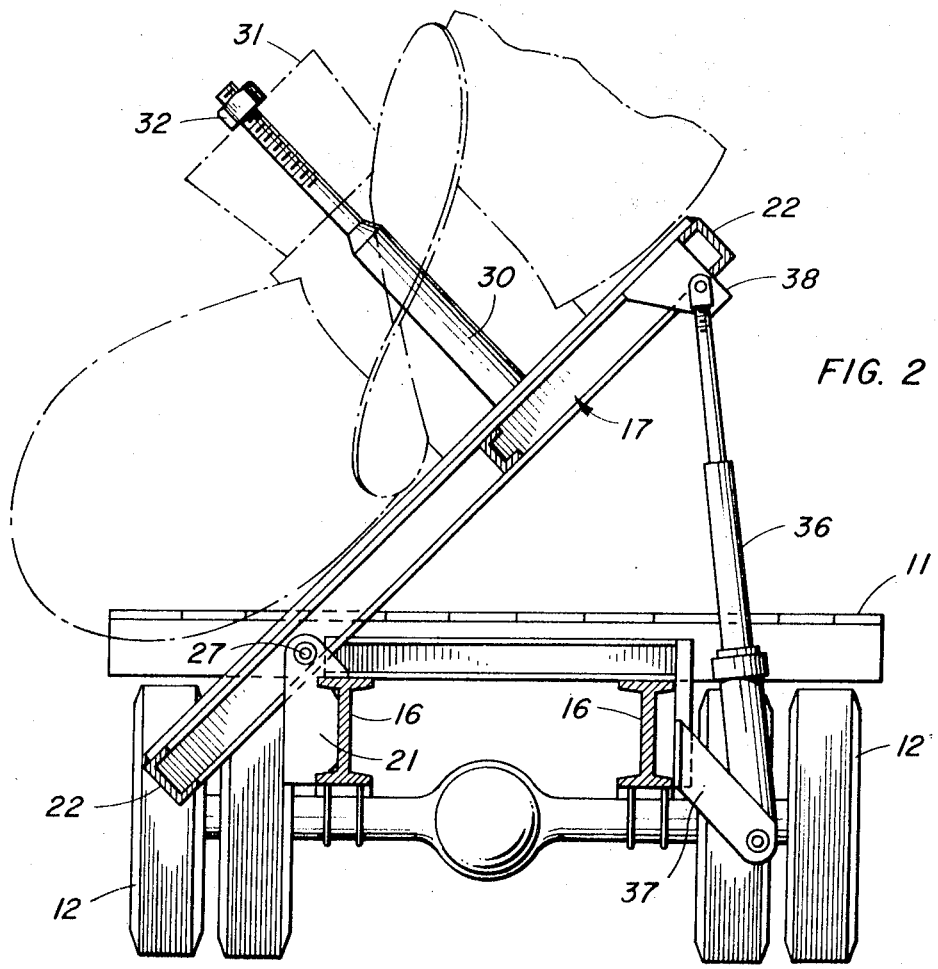
FIG. 2 is a sectional view of the apparatus shown in FIG. 1 taken about line 2—2.

As shown more clearly in FIG. 2, pin 30 may be inserted through the shaft hole of a ships propeller when the propeller comprises the object to be transported. In that event, the propeller may be retained by a coaxial plug 31 and a lock nut 32 mounted on the threaded end of pin 30. If the workpiece to be transported is not provided with a central aperture other known mechanical retaining means may be secured to plate 26 in lieu of pin 30.

A plurality of hydraulically operated pistons 36 are pivotally mounted at one end to the other I beam 16 by means of a hinge plate 37. The other end of the pistons 36 are pivotally mounted to one of the outer beams 22 by means of a corresponding plurality of hinges 38. Obviously, a plurality of compressed air cylinders could likewise be utilized in lieu of hydraulic cylinders, if desired.

Figure 3:
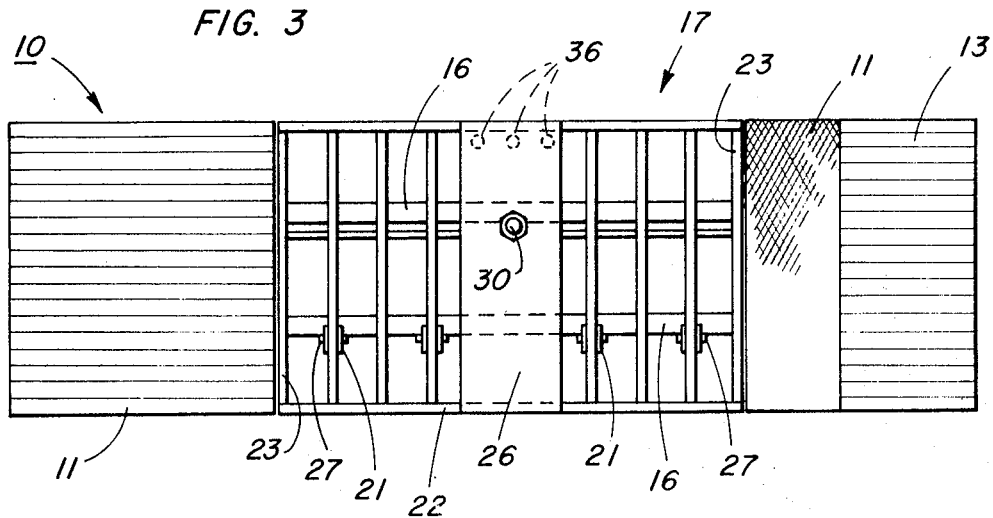
FIG. 3 is a plan view of the apparatus shown in FIG. 1.
Figure 4:
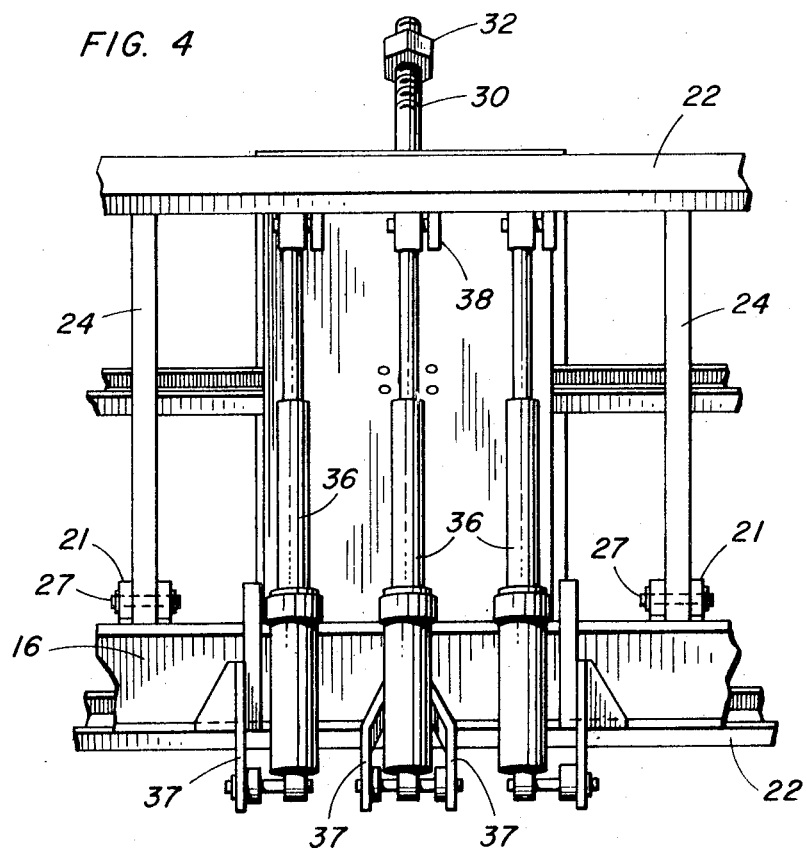
FIG. 4 is another side view of the apparatus shown in FIG. 1.

Load supporting member 17 may be pivoted between the horizontal position, as shown in FIG. 3, and a position substantially vertical, as shown in FIG. 1. Practically speaking, however, the angle used will lie somewhere between 55° and 35°, as shown in FIG. 2.

In operation, the load to be transported is fastened to load supporting member 17 by means of pin 30, or other load securing means, while the supporting member is in the horizontal position. This facilitates the loading procedure and reduces stress on the pins 27 and hinges 21 during loading. Next, pistons 36 are actuated by conventional valve means (not shown) to rotate supporting member 17 upwardly to the angle which simultaneously minimizes overhang in the horizontal and vertical planes. Conventional control means for the hydraulic cylinders will maintain load supporting member 17 at the desired angle. Alternatively, a simple mechanical fastener may be used to inhibit movement thereof when the trailer is subjected to stresses caused by poor road conditions, etc.

Figure 5:
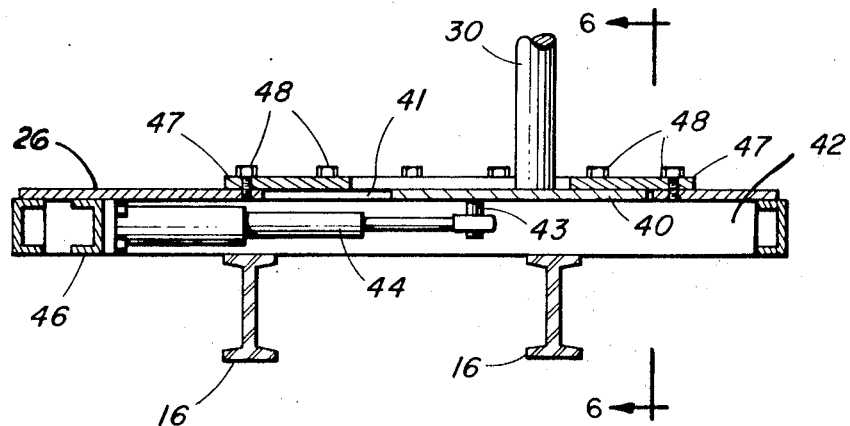
FIG. 5 is a cross-sectional view of an alternative embodiment of the invention.
Figure 6:
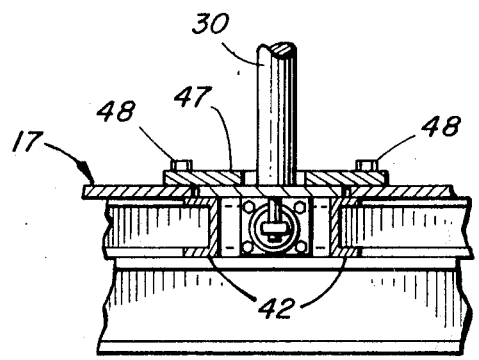
FIG. 6 is a cross-sectional view of the embodiment shown in FIG. 5 taken about line 6—6.

As previously discussed, merely displacing load supporting member 17 through the angle $\theta$ to minimize overhang may not suffice if the load to be transported is non-symmetrical. To that end, an alternate embodiment of the invention is shown in FIG. 5 and FIG. 6. In this embodiment, the lower end of pin 30 is fastened to a support plate 40 which is slidably mounted in, and retained by, a channel formed between an aperture 41 and a pair of U-shaped beams 42 mounted to the lower surface of member 17.

Plate 40 is connected by a pin 43 to a hydraulically operated cylinder 44 positioned beneath supporting member 17 and fastened at the other end to a cross beam 46 connected between and fastened to the U-shaped beams 42. A slotted cover plate 47 is mounted by bolts 48 to the upper surface of supporting member 17 to retain plate 40 in the channel formed between member 17 and U-shaped beams 42.

In operation, the non-symmetrical object to be transported is loaded onto support member 17 as discussed priorly, while the support member is in the horizontal position. Next, hydraulic cylinders 36 and 44 are simultaneously operated to rotate support member 17 upwardly and to move plate 40, and hence pin 30, in the channel formed between U-shaped beams 42 and member 17.

This insures that the vertical and horizontal overhang of the load is minimized but that the center of gravity of the load falls substantially over the center line of the trailer.

There is, of course, an interaction between the operation of cylinders 39 and cylinder 44 so that some trial and error is required before the optimum condition is attained, but a skilled operator can rapidly arrive at the desired combination of the rotation of load supporting member 17 and the displacement of pin 30. It will be noted that when member 17 is in the horizontal position, pin 30 may be removed and trailer 10 then may be used in a conventional manner to transport conventional loads.

One skilled in the art may make various changes to the apparatus and arrangement of parts disclosed without departing from the spirit and scope of the invention.

What I claim is:

1. Apparatus for transporting an object having one dimension substantially smaller than its other dimensions, which comprises:

a main body member adapted to receive at least one pair of rotatable transporting wheels;

a secondary body member pivotally mounted to said main body member;

means, connected to said main body member, for rotating said secondary body member about an axis parallel to the principal longitudinal axis of said main body member between a position substantially co-planar with said main body member and a position substantially normal to the plane of said main body member; and means, connected to said secondary body member, for mounting said object to said secondary body member so that as said secondary body member is rotated by said rotating means, the horizontal and vertical overhang of said object is minimized simultaneously.

2. Apparatus according to claim 1 wherein said mounting means is slidably connected to said secondary body member, and the apparatus further comprises:

means, connected to said secondary body member, for altering the relative position of said mounting means with respect to said secondary body member so that, as said rotating means alters the angle between said main body member and said secondary body member to minimize said horizontal and vertical overhang, said mounting means is moved to maintain the center of gravity of said apparatus substantially centered over the principal longitudinal axis thereof.

3. The apparatus according to claim 2 wherein said rotating means comprises at least one cylinder means operable by a controlled supply of a pressurized fluid.

4. Apparatus according to claim 2 wherein said altering means comprises at least one cylinder means operable by a controlled supply of pressurized fluid.

5. Apparatus according to claim 3 wherein said main body member comprises the flat bed portion of an articulated flat bed tractor trailer.

* * * * *